Jan. 29, 1952   P. E. SANDORFF ET AL   2,584,052
APPARATUS FOR COUNTING BLOOD CORPUSCLES
Filed Aug. 30, 1949   2 SHEETS—SHEET 1

INVENTORS:
HENRY W. FOSTER,
PAUL E. SANDORFF,
BY
ATTORNEY.

INVENTORS:
HENRY W. FOSTER,
PAUL E. SANDORFF,
BY
ATTORNEY.

Patented Jan. 29, 1952

2,584,052

UNITED STATES PATENT OFFICE 2,584,052

APPARATUS FOR COUNTING BLOOD CORPUSCLES

Paul E. Sandorff, Burbank, and Henry W. Foster, Los Angeles, Calif.

Application August 30, 1949, Serial No. 113,162

6 Claims. (Cl. 235—98)

This invention appertains to an improved method and apparatus for counting blood corpuscles, either red or white, present in a sample of the blood to be examined; the apparatus being automatic in operation, following the preparation of a solution made from a sample of the blood and a suitable diluent and of a slide containing a portion of the solution, and so designed that the completed count, in terms of cells per cubic millimeter, will be indicated by dial or register.

Generally, the invention involves the making of a solution by diluting a selected sample of blood with a diluent which will dissolve the unwanted cells and stain those which are to be counted. Following the loading of a slide, which is not necessarily graduated with a portion of the prepared solution, it is secured in place on a table for scanning, either by mechanical movement relatively to a stationary optical scanner, or by moving the optical scanner relatively to the slide held stationary, the former of these two methods of scanning is preferably here employed. With the prepared slide in place, it is illuminated by light of proper spectrum and intensity and then viewed by a microscopic optical system whose field is of a size comparable to that of the cells to be counted. By mechanical means the field is made to traverse over the slide in accordance with a fixed pattern and controlled rate, so that in effect a definite area is examined. The difference in light level of the field, when occupied by a cell, or a predetermined portion of a cell as compared with the open area of the slide, is transformed into an electrical quantity of a measurable amount by an electron multiplier photocell. The resultant signal is suitably amplified and applied to a counting device. The proper proportional relationship (which may contain a statistical correction) is inserted at this point so that the final register of the counter indicates in the desired units. A field stop is employed to limit the optical field to the approximate dimension of a single blood cell.

The electrical output of the photocell is filtered to increase the signal to the noise ratio of the measuring system and, since the scanning speed is approximately constant, the rate of change in light intensity, caused by a cell entering the optical field, is held to a nearly constant value, the signal to noise ratio may be increased by a large factor by proper selection of the frequency response of the measuring system. Such filtering also aids in sharply defining the width of field scanned, since cells passing through the edge of the optical field will present a lower rate of change of light intensity as compared with those passing near the center of the field. Several stages of electronic binary counters are used to scale down the counting rates to those practical for a mechanical counter, thus making a large total count practical with a resultant increase in statistical accuracy.

Figure 1:
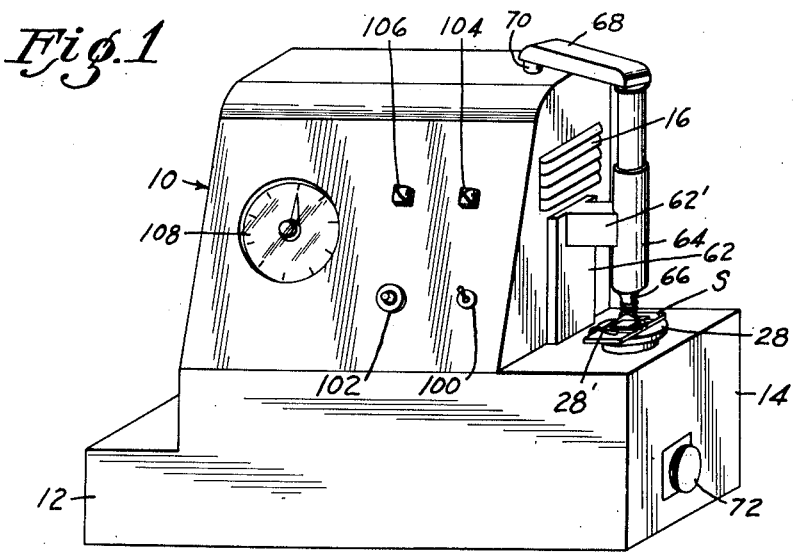
Figure 1 is a perspective view of a preferred embodiment of the apparatus, in accordance with our invention.

Referring to the drawings, wherein like characters of reference denote corresponding parts throughout the several views, and more particularly to Figure 1, 10 designates a casing having laterally offset lower end portions 12 and 14. Housed within the central portion of the casing 10 is the electrical measuring circuit shown in Figure 6, and within the offset portion 14 is the turntable unit shown in Figures 2 through 4. The front wall of the central portion of the casing 10, above the plane of the top side of the offset portion 14, is preferably sloped upwardly in a rearward direction for convenience in manipulating certain of the operative controls of the apparatus and for the observation of the count totalizer positioned thereon, and each of the end walls of the portion of the casing, immediately below the same, is a series of horizontally louvered ventilating openings 16, to dissipate heat from the interior thereof as it may be generated in the aforesaid measuring circuit.

Figure 2:
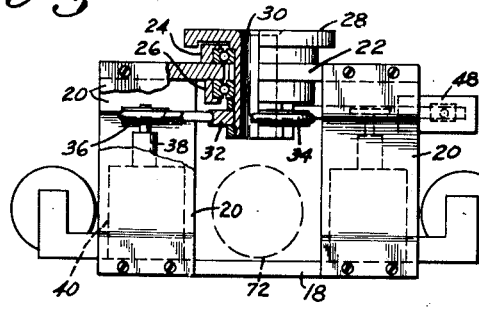
Figure 2 is a side elevation of the slide supporting unit removed from the casing, and showing the movable table, its mounting, and its operating mechanism, the table and the mounting being partly broken away and partly in section.
Figure 3:
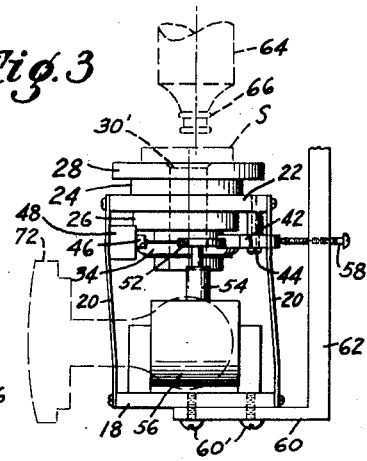
Figure 3 is an end elevation of the unit.
Figure 4:
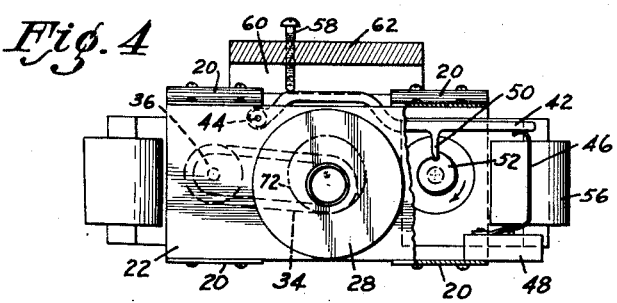
Figure 4 is a top plan view, with a portion of the top of the unit broken away to show the cam actuated means for imparting a translatory motion to the table.

Now, referring to Figures 2 through 4, the turntable unit is shown therein as it appears when removed from the offset portion 14, of the casing 10, and it is comprised in an open frame formed of a bottom wall 18, spaced flexible side walls 20, rising from the opposite side edges of the bottom wall, and a top wall 22 supported on the upper ends of the side walls. The flexible side walls 20 maintain the top wall 22 parallel to the bottom wall 18 and also act as flat springs tending to center the top wall 22 with respect to the bottom wall 18 while the former undergoes translatory motion. The top wall 22 is provided with a central opening which is bounded by ball races 24 and 26, mounted respectively on the upper and lower sides of the wall. Depending through the ball races is the hub 30 of a turntable 28, the upper ball race 24 having both inner side and top ball raceways, substantially as shown in Figure 2, so that the turntable rests upon the balls in the top raceway.

Keyed on the lower end of the hub 30, below the lower ball race 26, is a pulley 32 which is connected by an endless belt 34 to a pulley 36 keyed on the upper end of the output shaft 38, of a synchronous motor driving unit 40, the latter type of electric motor being employed in order to maintain the speed of the turntable constant. In addition to the rotative motion imparted to the turntable 28, it is desired that a horizontal translatory motion be imparted to the same and, to such end, an arm 42 is pivoted at one end, as at 44, to the underside of the top wall 22, toward one end thereof, and extends longitudinally toward and slightly beyond the opposite end of the same and has a laterally inward extending finger 50, spaced inward from its free end, bearing on the active surface of a cam element 52, which is keyed on the upper end of the output shaft 54 of a second synchronous motor driving unit 56, also supported on the bottom wall 18. The translatory motion of the top wall 22 is obtained by the action of the cam surface 52 applied through the arm 42, being reacted by an adjustable stop, such as the screw 58, which is mounted in the vertical portion 62, of an angled bracket 60, that has its lower horizontal portion secured, as at 60', to the underside of the bottom wall 18, of the unit frame. This vertical portion 62 projects upwardly through the top wall of the offset portion 14, of the casing 10, in abutted relation with the adjacent end wall of the casing, substantially as shown in Figure 1, when the unit is placed within the said offset portion.

Positioned above the turntable 28 is a microscope 64, which is dependingly supported with respect to the outer end of a hollow arm 68 extending outward from the top of the casing 10, the inner end of the arm being secured to the upper end of a tube 70 which depends into the interior of the casing through the top wall thereof; the objective lens mount 66, of the microscope, being spaced above and in line with the axial center of the turntable. A support 62' on the front side of the bracket portion 62 engages about the adjacent side of the microscope 64. A bore 30' extends vertically through the hub 30 and opens through the center of the turntable 28 in line with the objective lens mount 66, and a suitable light source 72, such as the electric lamp shown in Figure 6, is mounted below the lower end of the hub 30, so that light therefrom is directed upwardly of the bore.

The microscope 64 is equipped with the lenses 74 (lower) and 76 (upper) and with a field stop 78, positioned between the lenses, which limits the area being examined to substantially that of a single blood cell. Mounted within the opposite ends of the hollow arm 68 are prisms 80 and 82, the prism 80 being aligned with the lens and stop system of the microscope 64 and the prism 82 with the bore of the tube 70 which, in turn, is aligned with a phototube 84, mounted within the casing 10, all substantially as shown in Figure 6.

Figure 5:
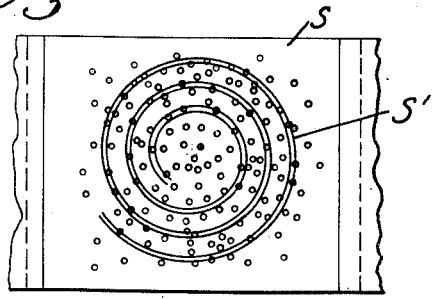
Figure 5 is a top plan view of the slide per se.

In operation, and as shown in Figures 1 and 5, a standard blood cell slide S is prepared in the customary manner as if for manual counting, and is placed on the turntable 28 and secured in correct position thereon, with reference to the bore 30', of the hub 30, and the lens mount 66, of the microscope 64, when light from the light source 72 passes upwardly of the bore 30', through the slide S and the optical system of the microscope to the prism 80, from whence it is directed through the hollow arm 68 to the prism 82, which, in turn, directs it downward of the tube 70 and onto the phototube 84, the latter being a RCA 931–A electron multiplier type, i. e., a combination electronic light responsive and cascade amplifier.

Figure 6:
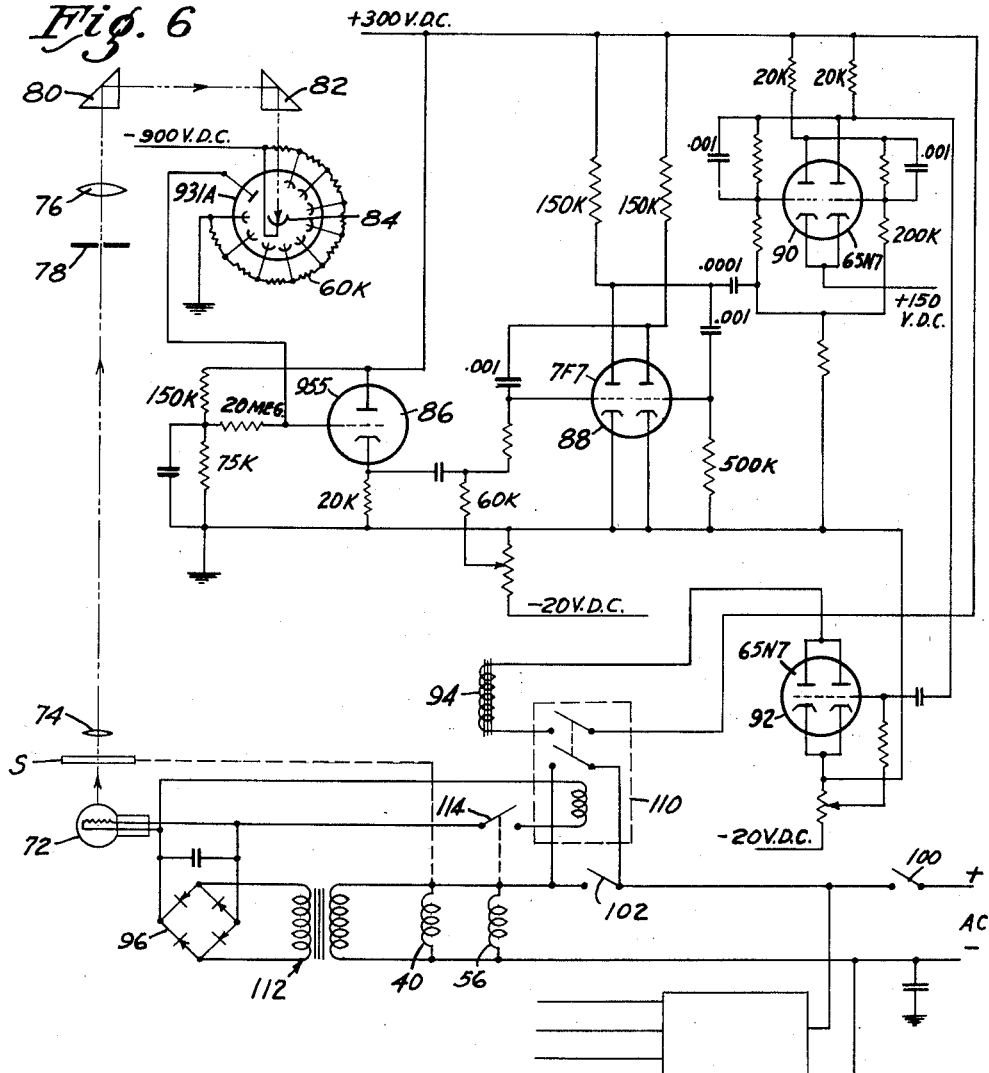
Figure 6 is a schematical view of the optical scanning system and the electrical measuring circuit.

Now, referring particularly to Figure 6, the output of the phototube 84 is impressed on the grid of a 955 triode tube 86 arranged in a cathode follower circuit, which permits developing of a reasonable current output for activating the next stage, without placing any drain on the phototube itself. This 955 tube circuit acts as a device to measure small voltage changes due to the minute current output of the phototube, and its output is filtered to increase the signal to noise ratio, i. e., to substantially reduce static, and thereafter triggers a single shot multi-vibrator type of circuit arranged with a double triode 7F7 tube 88 to form the sharp edged pulse of high negative voltage necessary to operate the binary electronic counter circuit. Preferably, this electronic counter circuit is made up with four binary electronic counters, of which but one is shown at 90, in order to make it possible to effect a very high rate of count of the corpuscles and, consequently, a high count in a short period of time; the output from the binary counter tube 90 being impressed on the tube 92 providing an output for a solenoid mechanical counter 94; the tubes 90 and 92 preferably being of the 6SN7 type.

In the use of four of the binary electronic counters 90, it requires two impulses from the 88 tube circuit to cause the first of the counters to emit one impulse, hence, it will require sixteen impulses from the circuit 88 to result in the emission of one impulse from the fourth binary counter, or, in other words, the effect is an electronic sixteen to one reduction, which reduction is desirable inasmuch as the final mechanical register is, as a rule, limited in resolution of individual counts.

The various voltages necessary for the operation of this hookup are provided through a transformer and rectifier unit 98, a transformer 112 and a selenium bridge rectifier 96 is provided to impress a non-fluctuating energy on the light source 72, although a constant voltage D. C. current may be had for the purpose by other means, and to provide an energy source to operate the control relay 110. The light source 72 must provide a proper level of the right type of illumination to the slide S to cause the actuation of the electronic counting circuit which is affected by contrast between the light level as it passes through the solution within the slide S and a stained corpuscle or, in other words, the character of the light should provide sufficient contrast as measured by the electron multiplier tube 84. Preferably, the light source 72 is a tungsten filament incandescent lamp, 28 v. D. C. rated, such as a G. E. miniature lamp number 844.

It is to be noted that the arm 42 actuates the arm 46 and opens a switch 114, housed in the case 48, when (and only when) it is in its minimum position as determined by the cam 52 acting against the finger 50. When the switch 114 is open the relay 110 is deenergized and consequently the solenoid counter 94 is deactivated; thus the entire counting cycle of the mechanism is defined by a single revolution of the cam 52, which is driven by the synchronous motor driving unit 56.

A main control switch 100, mounted on the front panel of the casing 10 is provided to connect the circuits of the apparatus through the transformer and rectifier unit 98, to an outside source of power, preferably 115 volt 60 cycle house current.

Also mounted on the front panel is a neon indicator lamp 104, which is energized from the same power source as the electronic tubes 86, 88, 90, etc., so that it lights up when the other tubes are ready to function.

In this embodiment of our invention, it is preferred to mechanically cause the slide S to be moved in a regular pattern, and the slide is shown in Figure 5, as is also the spiral path S' taken by the corpuscles, which is achieved by causing the turntable 28 to be revolved at a constant speed by the motor 40 and, at the same time, to be moved horizontally by the cam 52 acting through the finger 50 on the arm 42, the cam being driven by the motor 56.

In operation, a standard blood cell slide is prepared as before stated herein and it is placed on the turntable 28 and held in correct position thereon, with reference to the eye-piece 66, of the microscope 64, and the bore 30', in the hub 30 of the turntable 28, by means of clips or the like 28'. By now closing the main control switch 100, the neon lamp 104 will light up and the apparatus is ready to function as soon as the several tubes have "warmed up," following which, the operator then presses a button type switch 102 to close a circuit on the motors 40 and 56, and energize transformer 112 which provides energy for the light source 72 and the control relay 110. This switch 102 is held closed until the finger 50, on the arm 42, rises from the low point of the inclined plane of the cam 52, as best shown in Figure 4. When this occurs, the arm 46 closes the switch 114, causing the relay 110 to close which in turn causes a second neon lamp 106, also mounted on the front panel of the casing 10, to light up, and the solenoid counter 94 to become operative and also establishes a parallel current path around switch 102. Upon observing the lighting up of the neon lamp 106, the operator will release the switch 102 then the apparatus will continue to complete its cycle of operation; the count of the corpuscles being accomplished within approximately one minute from the start of the operation, when the cam 52 has made a complete revolution and the arm 46 returns to its minimum position, opening switch 114, and rendering the counting circuit inoperative.

With the lighting up of the lamp 72, its rays will travel upward through the bore 30', of the hub of the turntable 28, through the slide S, thence through the microscope 64, where the area of the slide being examined is limited by the field stop 78 to substantially the size of a single blood cell; the lower lens 74, of the microscope, being of the objective type and the upper lens 76 a collector type. From the upper lens 76, the light rays are diverted by the prisms 80 and 82 and impinged on the electron multiplier tube 84, the output of which is impressed on the grid of the triode tube 86, arranged in the cathode follower circuit. The output of the tube 86 is first filtered, to increase the signal to noise ratio, i. e., to substantially reduce static, and acts to trigger the double triode tube 88 to form the sharp edged pulse of high negative voltage necessary to operate the binary counter circuit 90. Thus, it will be obvious that the restricted image scanned at the eye-piece of the microscope 64 is impressed on the phototube 84 where the light is converted into electrical energy, which is thereafter multiplied and filtered and then delivered to the pulse forming circuit for the actuation of the electronic counters, whose output is directed to the solenoid mechanical counter 94 and a totalizing indicator 108; the latter being mounted on the front panel of the casing 10, as shown in Figure 1.

The circuits 88 and 90 are optional, since, if it were desired to power a mechanical counter directly without using the electronic counters, in which case, the ouput from the tube 86 would probably be used to trigger a thyratron circuit which would operate the mechanical counter.

While the invention as hereinbefore described is particularly set forth for counting blood, it is to be understood that the appended claims are to be interpreted as covering if used for counting blood cells in photographic images as well as other microscopic particles.

Having thus fully described our invention, it is to be understood that the words which we have used are words of description rather than of limitation and that changes within the purview of the appended claims may be made, without departing from the true scope and spirit of the invention in its broader aspects.

We claim:

1. An apparatus for counting blood corpuscles or the like, comprising a slide having distributed thereon a diluted sample, an optical means for viewing an area of the slide restricted to approximately less than the size of an individual corpuscle, a means for causing relative motion between the slide and the optical axis so that the slide is scanned along a spiral path, a means for converting the fluctuations in light caused by the scanned corpuscles into electrical pulses, a means for rejecting electrical pulses occurring at frequencies differing appreciably from that at which a corpuscle passes centrally through the optical field, a counting device, and a means for causing the electrical pulses to actuate the counter device.

2. An electronic apparatus for counting blood corpuscles, comprising a turntable, a slide containing a diluted sample of blood adapted to be mounted on said table, means for securing said slide in proper position on said turntable, means for revolving said turntable, other means for moving said turntable horizontally in order to affect movement of the diluted blood sample in a path of a predetermined pattern, a light source, means for directing light rays from said source to and through said slide, a microscopic means positioned above said slide in line with the path of the light rays passing through the slide for successively scanning individual corpuscles as they pass a given point along the path of the movement thereof, means for converting the light passing through the scanned corpuscles and said microscopic means into electrical energy, a counter device, and means for utilizing said electrical energy to affect the operation of said counter device.

3. The invention as defined in claim 2, with the said turntable revolving means comprised in a synchronous motor operatively connected with said turntable to revolve the same at a constant rate of speed, a flexible mounting for said turntable, said means for moving said turntable horizontally comprised in a second synchronous motor, and means driven by said second motor and cooperative with said flexible mounting for affecting the horizontal movement of the turntable.

4. The invention as defined in claim 2, with said microscopic means comprised in an open ended casing, an eye-piece having an objective lens at the lower end of said casing, and a field stop located within said casing above said objective lens to limit the area of the slide scanned corresponding to approximately the area of a single corpuscle.

5. The invention as defined in claim 2, with the said means for converting the said light rays into electrical energy comprised in an electron multiplier phototube, and said counter device in a binary electronic counter.

6. The invention as defined in claim 2, with the said means for converting the said light into electrical energy comprised in an electron multiplier phototube and said counter device in a binary electronic type counter, and a solenoid mechanical counter actuated by the output from the tube of said electronic counter.

PAUL E. SANDORFF.
HENRY W. FOSTER.

REFERENCES CITED

The following references are of record in the file of this patent:

UNITED STATES PATENTS

| Number | Name | Date |
|---|---|---|
| 1,455,795 | Logan | May 22, 1923 |
| 1,974,522 | Twyman et al. | Sept. 25, 1934 |
| 2,037,044 | Reinartz et al. | Apr. 14, 1936 |
| 2,105,470 | Bower | Jan. 18, 1938 |
| 2,183,606 | Day | Dec. 19, 1939 |
| 2,369,577 | Kielland | Feb. 13, 1945 |

OTHER REFERENCES

Popular Science, page 170, May 1949.